No. 698,903. Patented Apr. 29, 1902.
J. F. CARR.
HORSE BREAKER AND STARTING MACHINE.
(Application filed Dec. 4, 1901.)
(No Model.) 4 Sheets—Sheet 1.

No. 698,903. Patented Apr. 29, 1902.
J. F. CARR.
HORSE BREAKER AND STARTING MACHINE.
(Application filed Dec. 4, 1901.)

(No Model.) 4 Sheets—Sheet 2.

Witnesses
Alfred O. Eicks
John O. Rippey

Inventor
J. F. Carr
by Higdon and Longan attys

No. 698,903. Patented Apr. 29, 1902.
J. F. CARR.
HORSE BREAKER AND STARTING MACHINE.
(Application filed Dec. 4, 1901.)
(No Model.) 4 Sheets—Sheet 3.
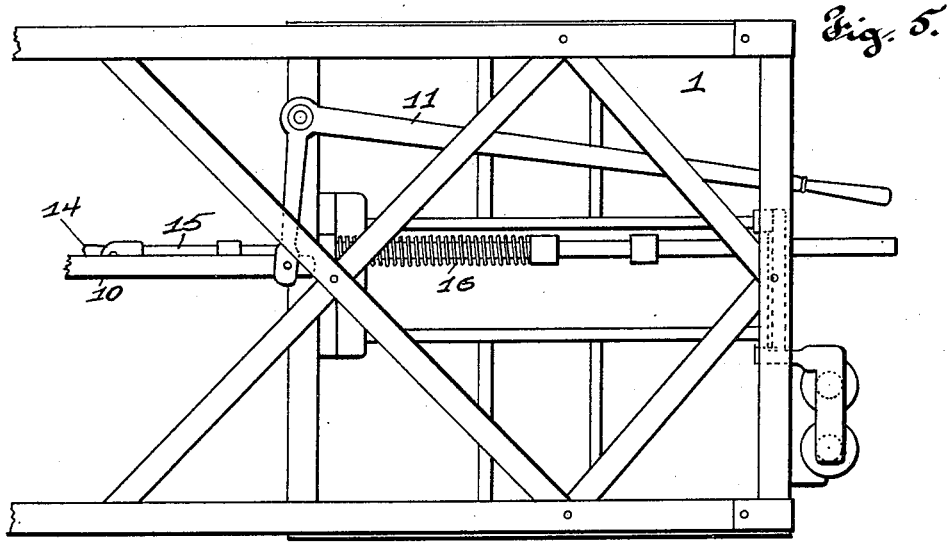
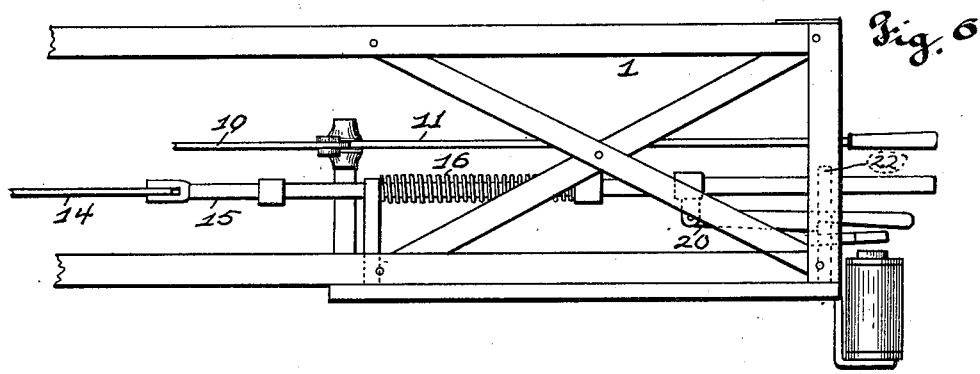
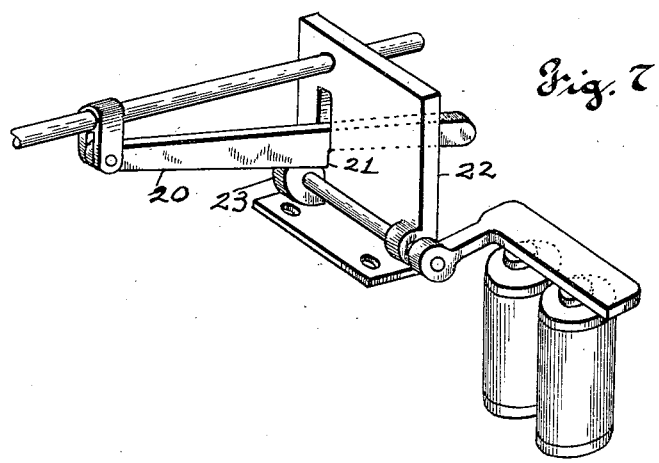

No. 698,903. Patented Apr. 29, 1902.
J. F. CARR.
HORSE BREAKER AND STARTING MACHINE.
(Application filed Dec. 4, 1901.)
(No Model.) 4 Sheets—Sheet 4.

UNITED STATES PATENT OFFICE.

JOHN F. CARR, OF ST. LOUIS, MISSOURI.

HORSE BREAKER AND STARTING MACHINE.

SPECIFICATION forming part of Letters Patent No. 698,903, dated April 29, 1902.

Application filed December 4, 1901. Serial No. 84,629. (No model.)

*To all whom it may concern:*

Be it known that I, JOHN F. CARR, of the city of St. Louis, State of Missouri, have invented certain new and useful Improvements in Horse Breaker and Starting Machines, of which the following is a full, clear, and exact description, reference being had to the accompanying drawings, forming a part hereof.

This invention relates to horse breaker and starting machines; and it consists of the novel construction, combination, and arrangement of parts hereinafter shown, described, and claimed.

My present invention relates to an improvement upon the apparatus shown and described in my United States Letters Patent No. 674,162, dated May 14, 1901.

The object of this invention is to provide an improved movable starting-machine consisting of a series of stalls, each to accommodate a horse and each stall having a removable front barrier, all of which can be moved simultaneously, thereby insuring an even start of all the contestants.

Another object is to provide an improved machine of the class mentioned, each stall of which is provided with a front barrier having a fastening device, whereby it may be retained across the front of the stall, and means for automatically moving it from across the stall to release the horse contained therein.

A still further object is to provide an improved machine of the class mentioned with a plurality of stalls, each of which is arranged to be swung back against the frame or removed completely therefrom when it is desired to convey the machine from place to place.

Figure 1:
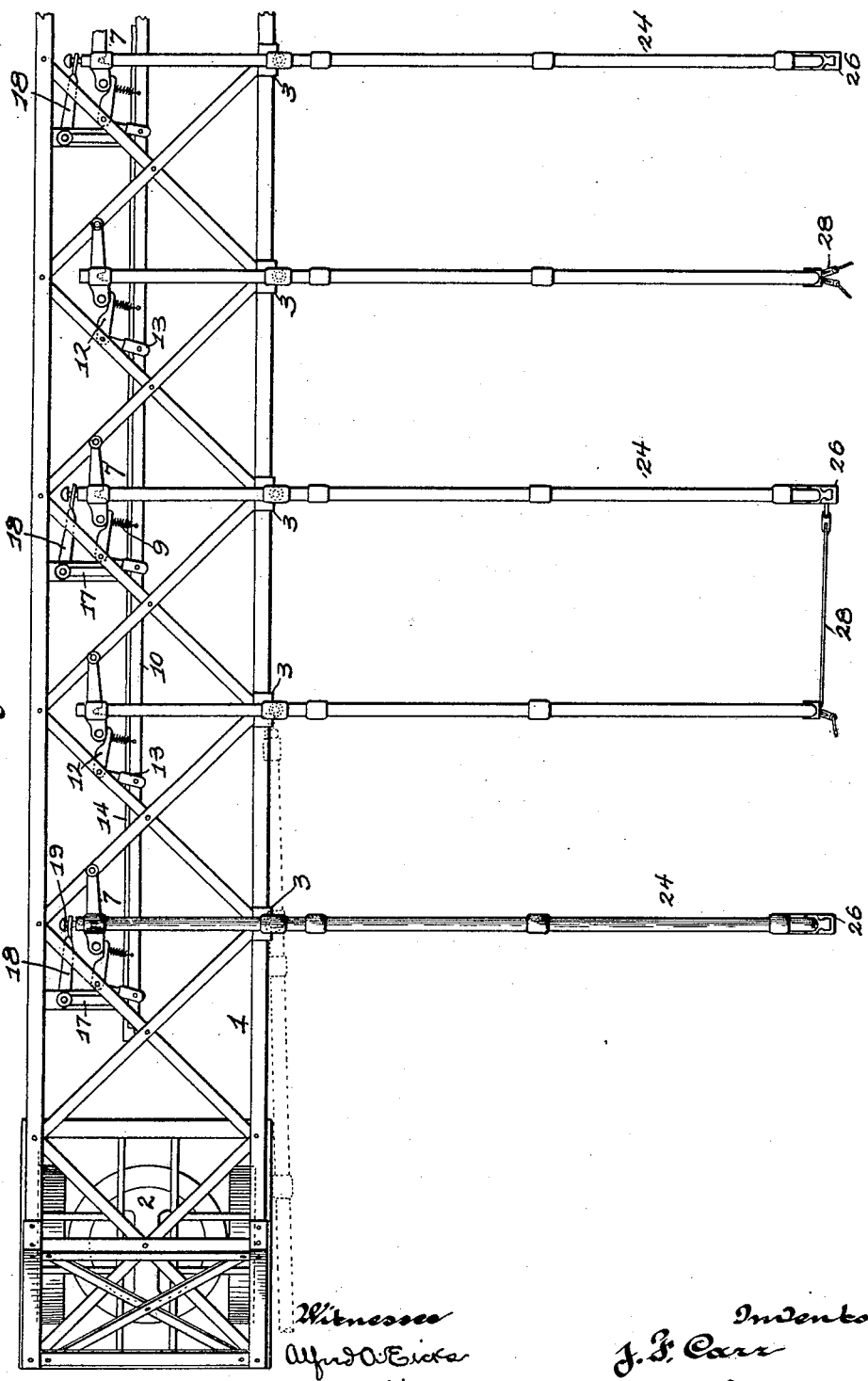
Figure 2:
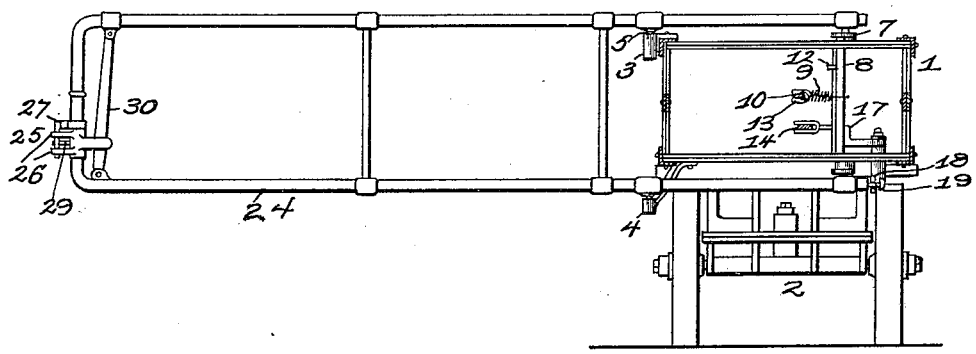
Figure 3:
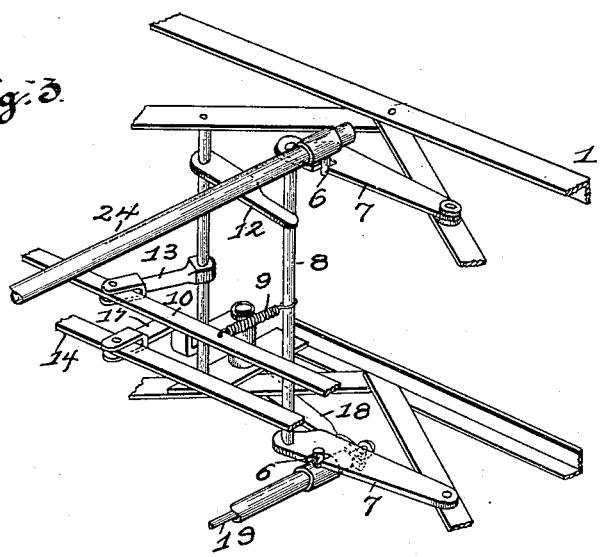
Figure 4:
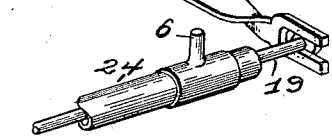
Figure 8:
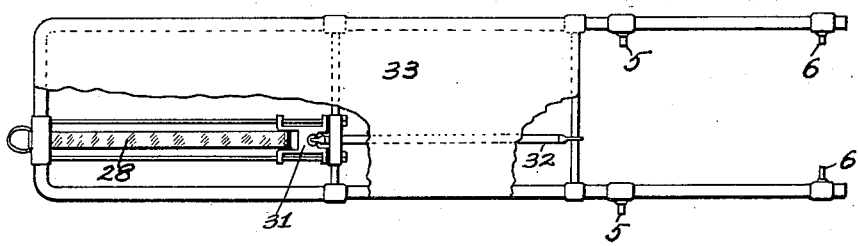
Figure 9:
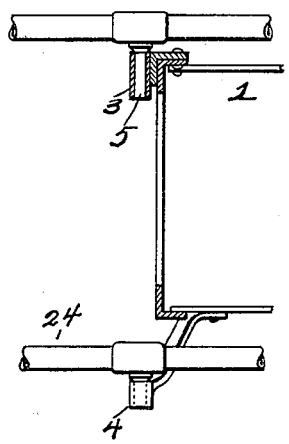
Figure 10:
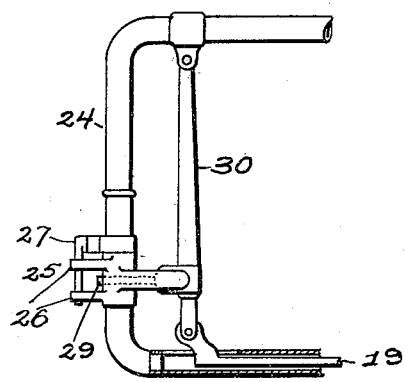

Figure 1 is a top plan view of a portion of my invention, showing the arrangement of the stalls and their locking mechanism. Fig. 2 is an end view of the same. Fig. 3 is a detail perspective view of the locking and releasing mechanism, with parts broken away for clearance. Fig. 4 is a detail perspective view of one of the releasing-arms made use of in connection with my invention. Fig. 5 is an enlarged top plan view of one end of the machine, showing the automatic releasing mechanism. Fig. 6 is a side view of the same. Fig. 7 is a detail perspective view of the electric mechanism for operating the releasing mechanism. Fig. 8 is a side view of one of the side barriers detached from the machine. Fig. 9 is a detail vertical sectional view of a portion of the frame, showing the pivotal arrangement of the side barriers. Fig. 10 is a side view of the end of the side barrier.

In the construction of the device as shown I provide a supporting-frame 1, mounted upon trucks 2 of any suitable construction, arranged one on each end for supporting and conveying the machine. The frame, as will be observed, is suitably braced, forming a rigid structure. Upon the upper front side of the frame are arranged sockets 3, and beneath the same, secured to the lower portion of the frame by means of brackets, are sockets 4. The purpose of these sockets is to receive the trunnions 5, carried by the frame of the side barriers and acting as hinges. The inner ends of the side-barrier frame are also provided with trunnions 6, which contact with locking-levers 7, pivotally secured to the frame. The levers 7 are connected by a vertical bar 8, provided with a spring 9, attached to a horizontal shift-bar 10, extending the length of the machine and pivotally connected to and operated by a lever 11, the purpose of which is to release the levers 7 from the trunnions when locked for folding or removing the barriers. This is effected by the arms 12, arranged upon vertical rods and actuated by the connecting-arms 13, attached to the horizontal bar 10, which press against the vertical bar 8, causing the levers 7 to be pressed outwardly, releasing the trunnions from the lock in the levers. Beneath the shift-bar 10 is arranged a similar bar 14, its one end pivotally secured to a rod 15, mounted in suitable bearings. Between the inner bearing and a collar arranged on the rod 15 is a spring 16, which is to be compressed by the movement of the rod to the left, the purpose of which when the same is released from its compressed state is to operate the levers 17, pivoted to the frame, in turn operating bifurcated levers 18 in communication with releasing-rods 19, extending through the lower portion of the side-barrier frames, the purpose of which is to release the front barriers, hereinafter referred to. The rod 15 carries a locking-lever 20, having a tooth 21 designed to come in contact with the lower portion of the slot formed in the bearing 22, through which the lever is passed, and is released from its locked position by a cam 23, operated by a rod forming a part of the electric releasing mechanism. The current passes through the coils of the magnet, attracts the armature, which operates the cam, thereby raising the lever 20, freeing the tooth from the bearing, and the expansion of the compressed spring 16 will pull upon the bar 14, operating the levers, as before specified.

The side barriers 24 are provided on their outer ends with a locking device 25, consisting of two projecting ears 26, each provided with an opening to receive the projection of the sliding sleeve 27. Between the ears is placed the loop of the flexible front barrier 28 and is held in place by a pin 29, secured to a fulcrumed lever 30 and manipulated by the movement of the releasing-rod 19. (See Fig. 10.) Each alternate side barrier is provided with the elastic front barriers 28, their inner ends secured to a sliding block 31, operating on parallel rods and controlled by a spring or elastic cord 32. The purpose of the spring or elastic cord 32 is to draw the block 31 and elastic front barriers into position, as shown in Fig. 8, when released by the movement of the pin 29. The side barriers are covered with padding 33, which is to prevent the horses from in any way becoming scratched or injured. The side barriers may be removed from the machine when desired, and this is preferably done when moving the machine from track to track. At times it will be necessary to convey the machine but short distances, and in such cases the stalls or side barriers are folded against the frame one over the other, as shown by dotted lines in Fig. 1.

The operation of my invention is as follows: The machine is placed across the race-track, and the side barriers are placed in their extended position, the inner ends are locked by the locking apparatus, and the machine is then in operative position. The horses are placed within the stalls formed by the side barriers, and the elastic front barriers are drawn from the frame and extended across to the opposite side barriers and locked therein. When the race is to be started and the horses are all in the stalls in position, the starter by the use of an electric button or any other suitable device releases the locking-arm 20, which is raised by the cam and frees the tooth from the bearing, and the expansion of the spring 16 will pull upon the releasing-lever and remove the bifurcated levers outwardly, pulling upon the releasing-rod 19 and in turn releasing the locking mechanism in the front end of the barriers, freeing the end of the elastic front barriers, and the same will instantly assume their normal position within the barriers by the action of the spring or elastic cord 32 drawing upon the head 31. When a race is desired to be duplicated, the same operation is repeated.

When it is desired to remove the entire machine from the track, the frames are folded against the machine, and this is done by pulling upon the hand-lever 11, releasing the lever 7 from the trunnions, and the same will be allowed to swing on the center trunnions and fold against the frame. The trucks upon which the machine is supported may be of any desirable construction, so that the entire device may be conveyed to any place. The frames are removed from the machine as desired, which is preferably done when a few of the stalls are to be used.

I claim—

1. A starting-machine having a main frame, a series of projecting hinged stalls, automatically-released front barriers for said stalls, and means for folding said stalls against the said frame, substantially as specified.

2. A starting-machine, consisting of a frame, a plurality of stalls formed by side barriers, said side barriers hingedly secured to the frame, and means for folding the same, substantially as specified.

3. A starting-machine, consisting of a suitable frame, a plurality of side barriers hinged to and projecting from said frame, means for folding said barriers, front barriers carried by the side barriers, a locking mechanism carried by the side barriers for holding the front barriers, and means for automatically releasing the same, substantially as specified.

4. A device of the class described, comprising a series of frames forming stalls, said frames padded and hingedly secured to a frame, means for locking the frames in a rigid position, a locking mechanism and front barriers carried by the frames, means for releasing the front barriers, and means for releasing the frames for removing or folding the same, substantially as specified.

5. A starting-machine of the class described, consisting of a frame mounted upon trucks, a plurality of frames forming stalls pivotally connected to and projecting from said frame, a locking mechanism mounted in the frame for locking the stalls, front barriers carried by the stall-frames, a locking mechanism for retaining the front barriers across the stalls, and means for simultaneously releasing all the front barriers, substantially as specified.

In testimony whereof I affix my signature in presence of two witnesses.

JOHN F. CARR.

Witnesses:
ALFRED A. EICKS,
JOHN C. HIGDON.